Figure 1:
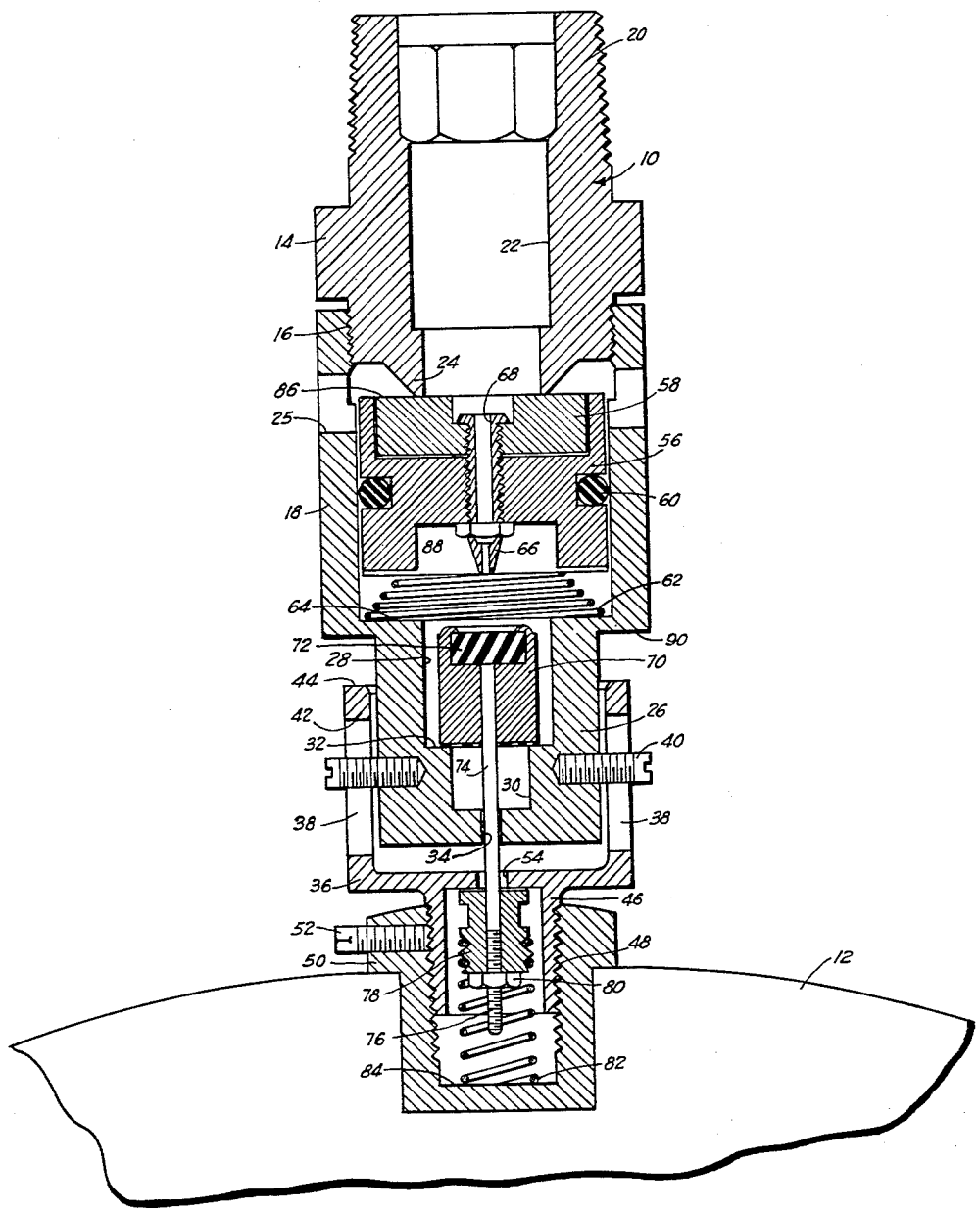

INVENTOR.
Glen R. Nations
BY
C. M. McKnight
ATTORNEY

United States Patent Office 2,931,377
Patented Apr. 5, 1960

2,931,377

FLOAT OPERATED VALVES

Glen R. Nations, Tulsa, Okla., assignor to Oil Capital Valve Company, Tulsa, Okla., a corporation of Oklahoma Application June 12, 1956, Serial No. 590,914

3 Claims. (Cl. 137—202)

This invention relates to improvements in a float operated dump valve and more particularly, but not by way of limitation, to a diaphragmless float valve adapted for utilization as an air or gas eliminator valve in oil separator vessels, filter units, or the like.

In the production of oil and gas products, it is desirable to separate the liquids from the gases in the well fluid. This is usually accomplished by directing the fluid from the producing well into a separator tank, or the like. In many instances, it is also desirable to filter the well fluid, and the separation and filtering processes may be combined in one vessel. The well fluid is normally under considerable pressure prior to entering the filter unit and thus creates a turbulence within the unit as it flows therethrough. The gaseous components of the well fluid are lighter in weight than the liquid components thereof, and as a result will rise within the vessel to the upper portions thereof. It is important to control the quantity of gas or air within the filter unit or separator in order to maintain an efficient operation thereof, and preclude physical damages thereto which may result from excessive quantities of gaseous vapor. Therefore, a valve in a normally open position is often provided on the tank or unit whereby the air may continuously escape therethrough except when conditions within the tank warrant the closing of the valve. The turbulence of the mixture within the filter unit often creates a foaming mixture therein which may not only escape through the open valve, but also hamper the closing action of the valve, and as a result an undesirable mist of oil or liquid particles may continuously or intermittently spew from the valve.

The present invention contemplates a diaphragmless float operated dump valve which may be utilized to efficiently eliminate air or gas from a separator or filter unit in a manner to substantially preclude the spewing of liquid particles therefrom. The actuating float member may be calibrated to float on the foam mixtures and the liquid components of the well fluid and to sink in the gaseous components thereof, thus the novel valve will be closed and positively sealed when the foaming mixture or liquid level rises above a predetermined level within the vessel to substantially preclude loss of liquid droplets through the valve. Under actual test conditions wherein the novel valve of the invention was compared with a valve presently in operation with filter units as herein described, it was found that the operation of the novel valve substantially eliminated the releasing of oil in the form of mist during both normal and abnormal operations of the filter unit. The other valve being tested did not efficiently preclude the loss of oil therethrough. Thus, the novel valve of the invention was deemed to be greatly superior in performance to the presently available valve.

The novel valve of the present invention may be adapted for an efficient operation in substantially any function wherein it is desired to maintain a predetermined fluid level or to eliminate air or gas vapors, such as in a pipe line or flow line operation. The elimination of a diaphragm greatly lengthens the efficient functioning of the valve without servicing or replacement of parts, and therefore, provides for a minimum of maintenance. Thus, the novel valve is not only efficient in operation, but is also of a durable and economical construction.

It is an important object of this invention to provide a float operated dump valve for controlling the quantity of air or gas in a separator tank or filter unit, or the like, wherein it is desirable to preclude an excessive accumulation of gaseous vapors therein.

It is another object of this invention to provide a float operated dump valve for eliminating air or gas from a separator tank or filter unit in a manner to substantially preclude undesirable loss of liquid therefrom.

It is still another object of this invention to provide a diaphragmless float operated dump valve wherein a positive seal is obtained when the valve is in a closed position and which greatly prolongs the serviceable life thereof with a minimum of maintenance.

It is a further object of this invention to provide a diaphragmless float operated dump valve which is simple and durable in construction and efficient and economical in operation.

Other objects and advantages of the invention will be evident from the following detailed description, read in conjunction with the accompanying drawings, which illustrate my invention.

In the drawings:

Figure 1 is a sectional elevational view of a float valve embodying the invention.

Referring to the drawings in detail, reference character 10 refers in general to a dump valve controlled by vertical reciprocal movements of a float member 12. The valve 10 comprises a cylindrical upper valve body 14 threadedly secured at 16 to a complementary lower valve body 18. The upper and lower valve bodies 14 and 18, respectively, are preferably made of brass to provide for durability of the valve 10. The upper valve body 14 is provided with an upwardly extending externally threaded sleeve member 20 in order to facilitate installation of the valve 10 within a separator tank or filter unit (not shown), and is further provided with a longitudinal bore 22 extending therethrough, and which is an outlet passageway for the valve 10. A downwardly extending tapered valve member 24 is provided on the lower portion of the upper valve body 14 for a purpose as will be hereinafter set forth.

The lower valve body 18 is substantially tubular in configuration and is provided with a plurality of circumferentially spaced apertures 25 for communicating pressure to the interior thereof. A downwardly extending boss member 26 is provided at the lower end of the valve body 18 and is provided with an internal longitudinally disposed bore 28 having a smaller bore portion 30 at the lower end thereof for providing a shoulder 32. A still smaller aperture 34 extends downwardly through the boss 26 from the bore 30. A sleeve member 36 is slidably secured to the boss member 26 by means of a plurality of circumferentially spaced elongated slots 38 provided in the sleeve member 36 and cooperating with a plurality of circumferentially spaced bolts or stud members 40 threadedly secured to the boss member 26. It will be apparent that the sleeve 36 may thus freely move telescopically with respect to the boss 26. The longitudinal downward movement of the sleeve member 36 is limited by the upper surface 42 of the slots 38 coming into contact with the studs 40, and vertical upward movement of the sleeve 36 is limited by the physical contact of the upper surface 44 thereof against the lower valve body 18. The sleeve 36 is further provided with a downwardly extending tubular projection 46 of a smaller diameter than the sleeve member 36 and provided with external threads 48 for receiving a substantially thimble shaped member 50 which may be rigidly secured thereto in any suitable manner such as a set screw 52. The sleeve member 36 is further provided with an aperture 54 in substantial alignment with the aperture 34 of the boss member 26 for a purpose as will be hereinafter set forth. The float member 12 may be rigidly secured to the thimble member 50 in any suitable manner, such as welding or the like (not shown).

A piston member 56 is slidably disposed within the lower valve body 18 and is provided with a valve seat member 58, preferably made of nylon, or the like, for cooperating with the valve member 24 in a manner as will be hereinafter set forth. A suitable sealing ring 60 is preferably disposed around the piston 56 to substantially preclude leakage of fluid therearound during operation of the valve 10. A conical spring member 62 is disposed within the tubular lower valve body 18 and rests on an internal shoulder 64 thereof in a position to constantly urge the piston 56 in an upward direction toward the valve member 24. A pilot valve member 66 is preferably centrally disposed within the piston 56 and may be threadedly secured therein in any suitable manner, as clearly shown in Fig. 1. The pilot valve 66 is provided with a longitudinally disposed orifice 68 for a purpose as will be hereinafter set forth. A pilot valve seat member 70 is slidably disposed within the bore 28 of the boss 26 and is provided with a resilient valve seat insert member 72 to cooperate with the pilot valve 66 for alternate opening and closing thereof. The valve seat member 70 rests or seats on the shoulder 32 in a lowered position of the valve seat to preclude the flow of fluid between the passageway 34 and the chamber 28. The pilot valve seat member 70 is carried by a valve stem 74 which is slidably disposed in the aligned apertures 34 and 54. The lower end 76 of the valve stem 74 is provided with external threads for receiving a suitable stop member 78 and nut 80. A helical spring 82 is disposed within the thimble member 50 and has one end suitably secured to the stop member 78, and the opposite end thereof is suitably secured to the bottom 84 of the thimble member 50.

Operation

The novel valve 10 may be readily installed in a separator tank or filter unit (not shown) in the usual manner by means of the threaded sleeve 20 in such a manner that the member 12 is disposed at the lower portion of the valve as shown in Fig. 1. The conical spring 62 constantly urges the piston member 56 in an upward direction so that the seat member 58 is in a closed position against the valve 24. The orifice 68 of the pilot valve 66 communicates fluid pressure from the upper surface 86 of the valve seat 58 to the chamber 88 below the piston 56 in order to provide a balance of pressures acting thereon and to maintain the valve 24 in a closed position during normal operation of the valve 10. It will be apparent that the spring member 62 may be suitably adjusted to withstand any desired predetermined pressure acting upon the upper surface 86 of the valve seat 58. When an excessive quantity of gas is present within the filter unit, the excessive pressure thereof will pass through the apertures 25 of the lower valve body 18 and exert a force against the upper surface 86 of the valve seat 58. This excessive pressure will overcome the force of the spring 62 and move the piston 56 in a downwardly direction to open the valve 24 and permit the gas or air to escape through the outlet passageway 22 for discharge from the vessel.

The float member 12 is rigidly connected to the tubular sleeve member 36 and thus any vertical fluctuations of the float will be transmitted thereto. The valve stem 74 is adapted to be vertically reciprocated by the sleeve 36 through the stop member 78 and nut 80. The vertical distance between the outwardly extending shoulder 90 of the lower valve body 18 and the upper surface 44 of the sleeve member 36 is preferably slightly greater than the distance between the valve seat insert 72 in its lowermost position and the pilot valve 66 in its uppermost position. The valve seat member 70 is usually disposed on the shoulder 32 during normal operations of the valve 10 and when the float member 12 is in its lowermost position. As the liquid level or foam mixture level (not shown) rises within the tank to a position above the desired predetermined level, the float rises therewith and lifts the valve stem 74 and valve seat 70 in an upward direction until the valve seat insert 72 contacts the pilot valve 66. If the valve 24 is in its normally closed position as shown in Fig. 1, the contact of the valve seat insert 72 against the pilot valve 66 functions to provide a more positive sealing action of the seat 58 against the valve 24 to preclude undesirable loss of liquid therethrough. If the foam mixture or liquid rises within the vessel when the valve 24 is in an open position (not shown) for discharging gas from the vessel, it will be apparent that the physical contact between the valve seat insert 72 and the pilot valve 66, and the upward movement of the valve seat member 70 will move the piston 56 upwardly and seat the valve seat 58 on the valve member 24 for a sealing thereof to substantially preclude loss of liquid therethrough. Because of the greater distance between the surface 44 and the shoulder 90 as hereinbefore set forth, the sleeve member 36 may be moved by the movement of the float 12 to a slightly higher position with respect to the lower valve body 18 after the valve seat 70 has raised the piston 56 to a seated position against the valve 24 in order to force the seat members more tightly against the valve members, and thereby provide a more positive sealing action of the valve 24 and the pilot valve 66. As the liquid level lowers within the vessel the float 12 will drop downwardly and move the valve stem 74 and the valve seat 70 to a lowered position within the lower valve body 18, and thereby release the piston 56 for actuation thereof by the spring 62 and the gas pressure entering the valve 10 through the apertures 25 as hereinbefore set forth.

From the foregoing, it will be apparent that the present invention provides a novel diaphragmless float operated valve adapted to eliminate excessive quantities of air or gas from a separator vessel or filter unit, or the like, in a manner to substantially preclude undesirable loss of liquid therefrom. The float member may be calibrated to sink in the gaseous components of the fluid passing through the vessel, and to float in the liquid or foaming mixture therein. In this manner the float member will close the novel valve unit with a positive sealing action to provide an efficient operation thereof. The spring urged piston member eliminates the necessity of providing a diaphragm member, thereby greatly lengthening the useful life thereof and greatly facilitating the servicing and maintenance thereof. The novel valve is simple and efficient in operation and durable and economical in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A dump valve comprising a substantially tubular housing, a tapered valve member provided within the housing, a spring urged piston slidably disposed within the housing, a valve seat carried by the piston to contact the tapered valve member for providing alternate positions of open and closed therefor during reciprocation of the piston, sealing means provided on the piston for precluding leakage of fluid therearound, said spring urged piston retaining the valve seat in a normally closed position adjacent the tapered valve member, said housing provided with a plurality of apertures for providing communication between the exterior of the housing and one face of the piston, a passageway provided in the housing and through the tapered valve for discharging fluid therethrough from the interior of the housing, a pilot valve provided on the piston member, a passageway extending through the pilot valve, a pilot valve seat reciprocally disposed in the housing in alignment with the pilot valve for alternately opening and closing the pilot valve, and a float member slidably secured to the housing member, means connecting the float to the pilot valve seat to reciprocate the valve seat member within the housing, said spring urged piston movable independently with respect to the float member for alternately opening and closing the tapered valve.

2. A dump valve comprising a substantially tubular body, a valve member provided in the body and having a passageway extending therethrough, a spring urged piston reciprocally disposed within the body in alignment with the valve member, a valve seat carried by the piston for alternately opening and closing the valve upon reciprocation of the piston, said spring urged piston retaining the valve seat in a normally closed position adjacent the valve member, a pilot valve carried by the piston, passageway means extending through the pilot valve for balancing the pressures acting on the piston, a pilot valve seat reciprocally disposed within the valve body in alignment with the pilot valve for alternately opening and closing said last mentioned passageway upon reciprocation of the pilot valve seat member, a float member slidably secured to the valve body, said float member in connection with the pilot valve seat to provide reciprocal movement therefor, and said piston member reciprocable independently with respect to the float member.

3. A dump valve comprising upper and lower tubular body members secured in longitudinal relation, a tapered valve member having a passageway extending therethrough provided on the upper valve body, a spring urged piston member slidably disposed within the lower valve body in alignment with the tapered valve, sealing means disposed around the piston member for precluding flow of fluid therearound, said piston provided with an insert member for seating on the valve member, said spring urged piston retaining the insert member in a normally closed position adjacent the tapered valve member, a pilot valve provided on the piston member, a passageway extending through the pilot valve for balancing the pressures acting on the piston, a valve seat reciprocally disposed in the lower valve body in alignment with the pilot valve for alternately opening and closing said last mentioned passageway, a float member slidably secured to the lower valve body member, means connecting the float to the valve seat member for reciprocation thereof with the float, said piston member movable independently of the float member for alternately opening and closing the valve member and responsive to increased pressure on one side thereof for opening the tapered valve member.

References Cited in the file of this patent
UNITED STATES PATENTS

| | | |
|---|---|---|
| 402,228 | Burke | Apr. 30, 1889 |
| 1,501,331 | Gulick | July 15, 1924 |
| 1,658,382 | Kimball | Feb. 7, 1928 |
| 1,915,559 | Thomson et al. | June 27, 1933 |
| 1,955,495 | Hack | Apr. 17, 1934 |
| 2,179,750 | McCraken | Nov. 14, 1939 |
| 2,574,823 | Fulkerson | Nov. 13, 1951 |
| 2,680,453 | Prijatel | June 8, 1954 |
| 2,715,415 | Tucker | Aug. 16, 1955 |
| 2,849,016 | Nations | Aug. 26, 1958 |